United States Patent
Li et al.

(10) Patent No.: US 10,255,378 B2
(45) Date of Patent: Apr. 9, 2019

(54) DATABASE STRUCTURE FOR DISTRIBUTED KEY-VALUE PAIR, DOCUMENT AND GRAPH MODELS

(71) Applicant: ADP, LLC, Roseland, NJ (US)

(72) Inventors: Haifeng Li, Scarsdale, NY (US); Roberto A. Masiero, Basking Ridge, NJ (US)

(73) Assignee: ADP, LLC, Roseland, NJ (US)

( * ) Notice: Subject to any disclaimer, the term of this patent is extended or adjusted under 35 U.S.C. 154(b) by 697 days.

(21) Appl. No.: 14/660,987

(22) Filed: Mar. 18, 2015

(65) Prior Publication Data
US 2016/0275201 A1 Sep. 22, 2016

(51) Int. Cl.
*G06F 17/30* (2006.01)

(52) U.S. Cl.
CPC .. *G06F 17/30958* (2013.01); *G06F 17/30292* (2013.01); *G06F 17/30315* (2013.01); *G06F 17/30595* (2013.01)

(58) Field of Classification Search
CPC ................................................ G06F 17/30958
USPC ......................................................... 707/798
See application file for complete search history.

(56) References Cited

U.S. PATENT DOCUMENTS

| | | | |
|---|---|---|---|
| 7,882,105 B2 | 2/2011 | Langier et al. | |
| 8,655,805 B2 | 2/2014 | Aggarwal et al. | |
| 2013/0103725 A1* | 4/2013 | Wee | G06F 17/30315 707/812 |
| 2013/0212131 A1* | 8/2013 | Reddy | G06F 17/30958 707/798 |
| 2013/0339293 A1* | 12/2013 | Witten | G06F 17/30067 707/609 |
| 2013/0339366 A1* | 12/2013 | Khimich | G06F 17/30587 707/741 |
| 2014/0172810 A1 | 6/2014 | Paradies et al. | |
| 2014/0181141 A1* | 6/2014 | Sowell | G06F 17/30911 707/769 |
| 2014/0310302 A1* | 10/2014 | Wu | G06F 17/30442 707/769 |

(Continued)

OTHER PUBLICATIONS

Davlet Dzhakishev, NoSQL Databases in the Enterprise, Department of Informatics, University of Oslo, 2014.
Dan Larocque, Titan Data Model, Aurelius, 2014.

*Primary Examiner* — Pierre M Vital
*Assistant Examiner* — Andrew N Ho
(74) *Attorney, Agent, or Firm* — Patrick J. Daugherty; Daugherty & Del Zoppo Co., LPA

(57) ABSTRACT

Aspects define NoSQL database structures that support wide-column, document, and graph data models. Documents are defined with different, unique keys and stored to different rows in a wide-column store by mapping their respective, unique keys directly to different row keys. Columns are defined for the document rows as including pairs of names and values, each column field having a different column name. Graph edges are defined as a function of relationships between a first source document and a second of the documents as tuples of first source document keys, second document keys as targets, tags as labels of relationships, and values of objects associated with the relationships. The graph edges are stored as graph columns within rows of the first source documents with names that are different from names of other columns within the first source document rows.

12 Claims, 2 Drawing Sheets

| Column Name | Value |
|---|---|
| name | "Best Book Store" |
| address | "street,city,state,zip" |
| address.street | "135 W 18th ST" |
| address.city | "New York" |
| address.state | "NY" |
| address.zip | 10011 |
| books | 2 |
| books[0].title | "Introduction to Big Data" |
| books[0].author | "Haifeng Li" |
| books[1].title | "The 20/20 Diet" |
| books[1].author | "Dr. Phil McGraw" |

(56) References Cited

U.S. PATENT DOCUMENTS

2015/0026189 A1* 1/2015 Li .................... G06F 17/30911
707/741
2015/0088924 A1* 3/2015 Abadi ............... G06F 17/30979
707/769
2016/0179883 A1* 6/2016 Chen ................ G06F 17/30292
707/714

* cited by examiner

| Column Name | Value |
|---|---|
| name | "Best Book Store" |
| address | "street,city,state,zip" |
| address.street | "135 W 18th ST" |
| address.city | "New York" |
| address.state | "NY" |
| address.zip | 10011 |
| books | 2 |
| books[0].title | "Introduction to Big Data" |
| books[0].author | "Haifeng Li" |
| books[1].title | "The 20/20 Diet" |
| books[1].author | "Dr. Phil McGraw" |

DATABASE STRUCTURE FOR DISTRIBUTED KEY-VALUE PAIR, DOCUMENT AND GRAPH MODELS

BACKGROUND

NoSQL ("Not only Structured Query Language") database structures or systems provide computer-implemented mechanisms for the storage and retrieval of data that is modeled in means other than the tabular relations that are used in relational databases. By breaking away from the relational storage model and leaving schemas behind, NoSQL databases are free of the limitations put upon them by a tightly bound schema and requirements for applications and structures to join data across tables.

NoSQL database structures commonly provide data through networking, store their data as JavaScript Object Notation (JSON) documents and provide Application Programming Interfaces (API's) in multiple languages. NoSQL document-oriented models, or "document stores," are designed for storing, retrieving, and managing document-oriented information, also known as semi-structured data. Document-oriented models systems are designed around an abstract notion of a "Document". One example is MongoDB, an open-source document database that provides high performance, high availability, and automatic scaling.

NoSQL database structures also include graph database models that use graph structures for semantic queries with nodes, edges, and properties to represent and store data. A graph database storage system provides index-free adjacency, wherein every element contains a direct pointer to its adjacent elements and no index lookups are necessary. General graph databases that can store any graph are distinct from specialized graph databases such as triple-stores and network databases. One example of a graph database is Neo4j, a product of Neo Technology, Inc.

NoSQL database structures also include distributed key-value pair database models, and examples include HBase, Accumulo, and Cassandra. HBase is a non-relational, distributed database developed as part of Apache Software Foundation's Apache Hadoop project that runs on top of HDFS (Hadoop Distributed File System) and provides a fault-tolerant way of storing large quantities of sparse data, small amounts of information caught within a large collection of empty or unimportant data. Apache Accumulo is a sorted, distributed key/value store written in Java® and has cell-level access labels and server-side programming mechanisms. (JAVA is a trademark of the Oracle Corporation in the United States or other countries.

Apache Cassandra is a partitioned row store database data model with tunable consistency, having rows organized into tables wherein the first component of a table's primary key is the partition key, rows clustered within a partition by remaining columns of the key, and wherein other columns may be indexed separately from the primary key. Cassandra enables tables to be created, dropped, or altered at runtime, without requiring the blocking of updates and queries, and asynchronous master-less replication allows for low latency operations for all clients.

BRIEF SUMMARY

In one aspect of the present invention, a computer-implemented method for defining a NoSQL database structure that supports wide-column, document, and graph data models includes a processor executing steps and thereby defining documents with different, unique keys. The documents are stored to different rows in a wide-column store by mapping their respective, unique keys directly to different row keys of the wide-column store. Columns are defined for each of the document rows within the wide-column store as including pairs of names and values, wherein each column field has a different column name. Graph edges are defined as a function of relationships between a first source document and a second of the documents as a tuple of a source, a target, a tag and a value. More particularly, the source is the first source document key, the target is the second document key, the tag is a label of the relationship, and the value is an object associated with the relationship. The graph edges are stored as graph columns within rows of the first source documents, with names that are different from names of other columns within the rows of the first source documents.

In another aspect, a system has a hardware processor in circuit communication with a computer readable memory and a computer-readable storage medium having program instructions stored thereon. The processor executes the program instructions stored on the computer-readable storage medium via the computer readable memory and thereby defines documents with different, unique keys. The documents are stored to different rows in a wide-column store by mapping their respective, unique keys directly to different row keys of the wide-column store. Columns are defined for each of the document rows within the wide-column store as including pairs of names and values, wherein each column field has a different column name. Graph edges are defined as a function of relationships between a first source document and a second of the documents as a tuple of a source, a target, a tag and a value. More particularly, the source is the first source document key, the target is the second document key, the tag is a label of the relationship, and the value is an object associated with the relationship. The graph edges are stored as graph columns within rows of the first source documents, with names that are different from names of other columns within the rows of the first source documents.

In another aspect, a computer program product for defining a NoSQL database structure that supports wide-column, document, and graph data models has a computer-readable hardware storage device with computer readable program code embodied therewith. The computer readable program code includes instructions for execution which cause the processor to define documents with different, unique keys. The documents are stored to different rows in a wide-column store by mapping their respective, unique keys directly to different row keys of the wide-column store. Columns are defined for each of the document rows within the wide-column store as including pairs of names and values, wherein each column field has a different column name. Graph edges are defined as a function of relationships between a first source document and a second of the documents as a tuple of a source, a target, a tag and a value. More particularly, the source is the first source document key, the target is the second document key, the tag is a label of the relationship, and the value is an object associated with the relationship. The graph edges are stored as graph columns within rows of the first source documents, with names that are different from names of other columns within the rows of the first source documents.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

NoSQL database structures provide for horizontal scalability and high availability. There are prior art NoSQL database structures that support one of different key-value pair (or "wide-column"), object/document and graph data models, but none that supports all in one database. In contrast, aspects of the present invention support each of these three data models via a wide-column store core, wherein document and graph data models are layers built on top of the wide-column core.

Figures 1, 2:
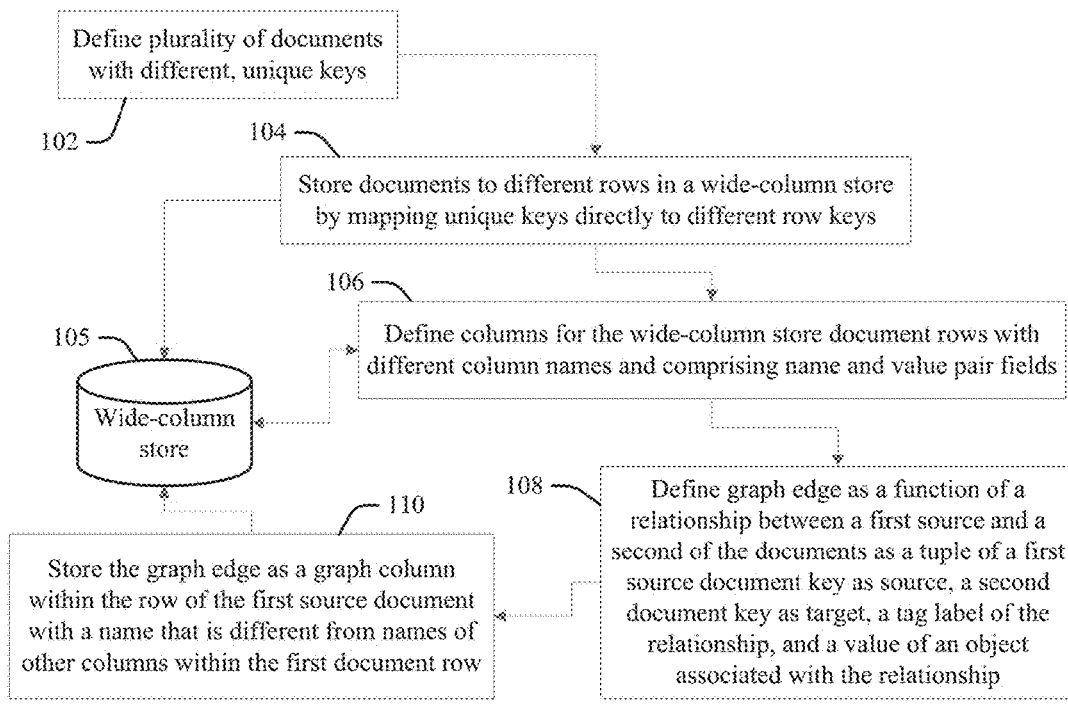
FIG. 1 is a flow chart illustration of a method or process aspect according to the present invention for a multi-model NoSQL database structure that supports wide-column, document and graph data models and full-text searching.
FIG. 2 is a tabular illustration of an example of encoding document object columns into a wide-column document and graph model according to the present invention.

FIG. 1 illustrates an aspect of a method, process or system according to the present invention for a multi-model NoSQL database structure that supports wide-column, document, and graph data models and full-text searching. At 102 a plurality of document objects are defined (or created), each with a unique key that is different from a key of any other of the documents. The unique keys are typically a unique alpha-numeric value (for example, "XYZ123"), though other keys may be practiced, as will be appreciated by one skilled in the art.

At 104 the documents are stored to rows in a wide-column storage structure (a "store") 105 by mapping the unique keys directly to different row keys of the wide-column store.

At 106 one or more columns are defined (created) for the document rows within the wide-column store 105 that have fields that are different respective pairs of names and values (name/value pairs), wherein the names function as column names and are unique to each of the columns relative to the other columns. If the value within a name/value pair is an array, then at 106 the wide-column store cell value is the size of the array, and a plurality of additional columns are defined for each value of the array in recursively named columns.

The document fields have a nested namespace while columns of the wide-column store have a flat namespace. Aspects flat the nested document namespaces at 106 by using a full path to a field as a column name. Thus, given a top level document, if a field "x" is of a basic value type (for example, int, long, double, date, string, Boolean, BLOB (byte array), object, etc.), the corresponding column name will be "x" and the cell value is the field value.

If a field "y" is an array (an ordered list of zero or more values, each of which may be of any type), at 106 a corresponding column is named "y" wherein the cell value is the size of the array, and for each element of the array the document row is populated with recursively encoded columns "y[0]", "y[1]", . . . , "y[n−1]", where "n" is the array length. If a field "z" is a nested document/object with sub fields "a", "b" and "c", then the document row has a corresponding column named "z" and having a cell value of "a,b,c," and also recursively encoded columns "z.a", "z.b", "z.c" encoded recursively.

The aspect described above is schema-less and uses the wide column structure to serialize and de-serialize documents to or from the wide-column store 105. The document fields need not be pre-defined, and users are free to put any fields into the document, or to update or delete one of the column fields, on runtime.

Further, at 108 a graph edge is defined as a function of a relationship between a first and a second of the documents as a tuple of a source, a target, a tag and a value, wherein the source is the first document key, the target is the second document key, the tag is a label of the relationship, and the value is an object associated with the relationship. The edges are permitted to have multiple, parallel relationships, wherein different edges may have the same end nodes, as long as they are each identified by different, unique tuple tag labels.

At 110 the graph edge is stored in the wide-column store 105 as a graph column within the row of (at least) the first source document with a name that is different from the names of other columns within said first document row.

In one example, implementation of the process or system of FIG. 1, a book store document object is assigned a unique key "XYZ123" (at 102) and contains the following fields:

```
{
  "name" : "Best Book Store",
  "address" : {"street": "135 W 18th ST", "city": "New York",
"state": "NY", "zip": 10011},
  "books" : [{"title": "Introduction to Big Data", "author":
"Haifeng Li"}, {"title": "The 20/20 Diet", author: "Dr. Phil McGraw"}]
}
```

The document object is encoded (at 104 and 106) into name/value pair columns listed in the table of FIG. 2 as unordered, associative arrays of fields within a row of the wide-column store 105 identified by the unique key "XYZ123".

In addition to the column names and values, the encoding also saves (indicates) data type indication data via field notation conventions. Thus, the column "books" has a value of "2" ("books=2"), which conveys that this data type is an array and that the value of "2" is the array size. In contrast, "zip=10011" indicates that the value is a simple integer. The present example uses "dot" notation to convey the data type, which is widely used in many programming languages (wherein dot cannot appear in field names). However, as will be appreciated by one skilled in the art, other aspects use other separators, such as "#" or "$", etc.

Aspects store documents in a column family (for example, "doc") while storing graph edges (at 110) in a different column family (for example, "graph"). This avoids column name conflicts between documents and graph edges. It is noted that HBase, Cassandra, and Accumulo each support column families, and are in this respect appropriate for practicing with the present aspect. For storage engines that do not support column families, aspects add unique prefixes to the column names (for example, "doc:" and "graph:") to avoid name conflicts.

Documents may be added on into another. For example, a document for the person "Haifeng" may be created via executing the following code:

```
// Create a document
val person = Document("293050")
person("name") = "Haifeng"
person("gender") = "Male"
person("salary") = 1.0
person("zip") = 10011.
```

Another, address document may be created, and added into the Haifeng document, along with a pair of arrays, by executing the following code:

```
// Create another document
val address = Document("293050")
address.street = "135 W. 18th ST"
address.city = "New York"
address.state = "NY"
address.zip = person.zip
// add a document into another one
person.address = address
// add an array into a document
person.projects = Array("GHCM", "Analytics").
```

Aspects use an adjacency list data structure to organize the graph information. Thus, where the person represented by the document "Haifeng" has a relationship "report to" another person represented by the document "Roberto" (where "Haifeng" and "Roberto" may be used to refer to document keys), a column "report to→Roberto" is encoded in the column family "graph" in the row of "Haifeng". In this example "→" is used as a separator between the relationship and the target node.

Other separators may also be used, provided they are not part of a relationship type. This structure is preferable to prior art adjacency matrix approaches (which are not efficient for spare matrices), and also enables full-text searching via inverted index methods. In some examples, the relationship may be the only information of interest, wherein the value of the cells is not important and is set to some arbitrary or default value (for example, value 1 by default).

Storing a graph edge at 110 may include attaching a document with the relationship. For example, a document {"start_date": 2014-01-01, "end_date": 2015-01-01} may define the relationship for the example of "report to→Roberto" and be encoded into additional columns "report to→Roberto.start_date" and "report to→Roberto.end_date".

The document "Haifeng" could have many relationships (outgoing edges). For example, different working relationships of Haifeng to each of other people Jim, Mike and Jerome may be represented by respective additional columns within the Haifeng row via execution of the following code:

```
// The following is to adding relationships
person("work with", "Jim") = true
person("work with", "Mike") = true
person("report to", "Jerome") = true
// Query the relationship with "Jim"
person.relationships("Jim")
// Find all neighbors with relationship "work with"
person.neighbors("work with")
person.neighbors("work with", "report to")
// Query the value/object associated with the relationship
("Haifeng", "report to", "Jim")
    person("report to", "Jim")
    person("report to", "Jerome").
```

As long as the combination of the relationship type and the target document ID is unique, the column names (and associate object fields) are unique.

Like a relational data model, the wide-column store organizes data in a table, of which each row/record has a unique key. However, in contrast to the relational data model, each row in the wide-column store has a large number of dynamic columns. The dynamic nature of the columns means that new columns can be added without pre-announcing. The documents are JSON-like objects and the structures defined in FIG. 1 are schema-less, and therefore the fields in any document need not be pre-defined. Instead, users are free to put any fields into a document (or update/delete a field) on runtime, and aspects serialize/deserialize documents to/from the wide-column store.

Although tables in relational databases may have a few thousand columns, wide-column data store may have millions or even billions of columns. Wide-column data are very sparse and empty data cells are not stored. Several databases, such as BigTable, HBase, Cassandra, and Accumulo, support a wide-column data model. Aspects of the present invention can be built on top of them by using them as storage backend/engine structures. In case of using simple key-value pair store (for example, LevelDB and RocksDB) as a storage engine, aspects of the present invention can easily encode wide-column into the storage engine by using a composite key (row, column), where row is the row key and column is the column name.

Data Manipulation Log (DML) structures may be defined by executing the following illustrative but not limiting or exhaustive example code:

```
val server = CassandraServer("127.0.0.1", 9160)
val table = server.dataset("small")
// person into table
val haifeng = table get "293050"
val partial = Document("293050").from(table).select("name", "zip")
partial remove "zip"
partial commit
table cacheOn
val haifeng = table get "293050"
haifeng.name = "Haifeng Li"
haifeng.gender = null
haifeng commit.
```

Aspects enable queries for neighbors or relationships, provide advanced graph operations such as graph traversal, shortest path, and other graph analysis, and support DFS, BFS, A* ("A-star") search, Dijkstra algorithm, topological sort and more with user defined functions. For example, illustrative but not limiting or exhaustive examples of graph operations include those generated by executing the following code:

```
// Google+™
val gplus = server.dataset("gplus", "public")
gplus cacheOn
val dan = gplus get "111065108889012087599"
val visitor = new SimpleDocumentVisitor(3, "follows")
visitor.dfs(dan)
visitor.bfs(dan)
// In memory graph processing
val astroph = server.dataset("astroph", "public")
astroph cacheOn
val author = astroph get "63225"
val graph = DocumentGraph(author, 2, "works with")
graph.topologicalSort
graph.dijkstra.
(GOOGLE+ is a trademark of Google, Inc. in the United States or other countries.)
```

A-star search is a best-first search that finds a least-cost path from a given initial node to one goal node (out of one or more possible goals). As A-star traverses graph relationships of aspects of the present invention, it follows a path of the lowest expected total cost or distance, keeping a sorted priority queue of alternate path segments along the way.

An illustrative but not limiting or exhaustive example of an A* search, is achieved by executing the following code:

```
val graphOps = new GraphOps[Document, (String, JsonValue)]( )
val path = graphOps.astar(haifeng, mike,
  (doc: Document) => {
  val neighbors = doc.neighbors("works with", "reports to")
  neighbors.foreach { case (doc, _) => doc.loadRelationships }
  neighbors.iterator
  },
  (a: Document, b: Document) => (a.rank, b.rank) match {
  case (ar: JsonIntValue, br: JsonIntValue) => math.abs(ar.value -
   br.value)
  case _ => 100
  },
  (a: Document, b: Document, e: (String, JsonValue)) => e._1 match {
  case "works with" => 1.
  case "reports to" => 2.
  case _ => 3.
  }
)
```

One result of the above A-star search may be: "Haifeng—works with→Roberto—reports to→Mike."

Aspects of the present invention include systems, methods and computer program products that implement the examples described above. A computer program product may include a computer-readable hardware storage device medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
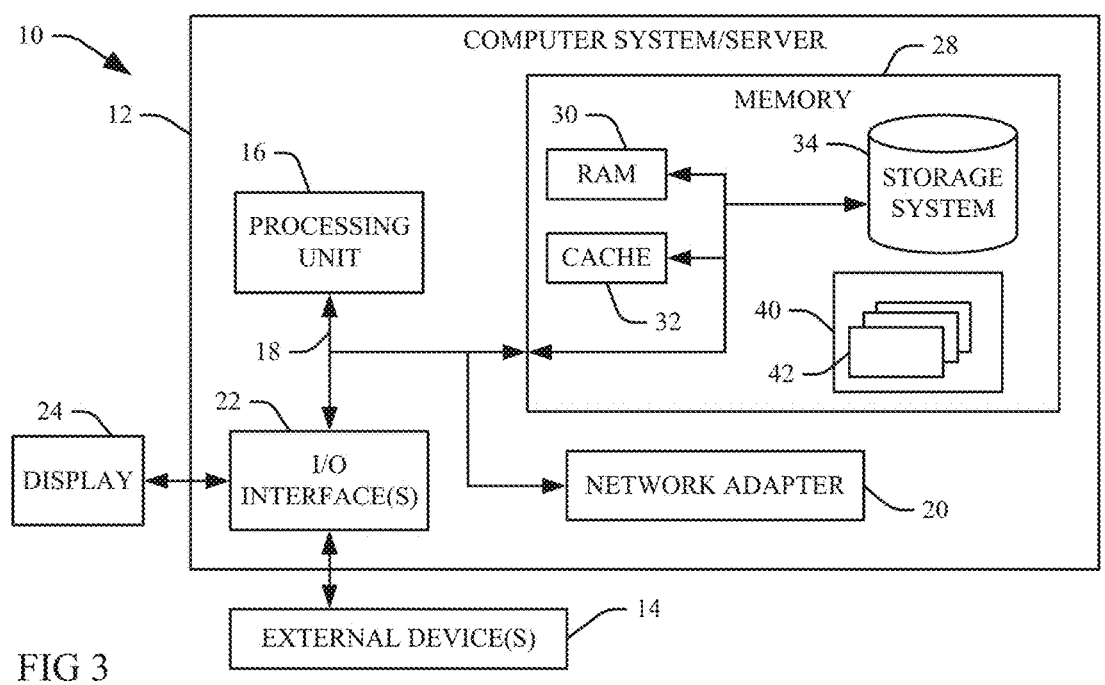
FIG. 3 depicts a computer device according to the present invention.

Referring now to FIG. 3, a computer system/server 12 is operational with numerous other computing system environments or configurations for defining a NoSQL database structure that supports wide-column, document, and graph data models according to the present invention. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In one aspect, a service provider may perform process steps of the invention on a subscription, advertising, and/or fee basis. That is, a service provider could offer to integrate computer-readable program code into the computer system/server 12 to enable the computer system/server 12 to define the NoSQL database structure that supports wide-column, document, and graph data models as discussed in the Figures. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer-readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for defining a NoSQL database structure that supports wide-column, document, and graph data models, the method comprising executing on a processor the steps of:
    defining a plurality of documents, each with a unique key that is different from a key of any other of the documents;
    defining a plurality of columns, one for each of a plurality of document rows, within a wide-column store, wherein the columns each have a field comprising a pair of a name and a value that is selected from the group consisting of a nested object and an array, wherein each of the column fields have different column names;
    indicating a data type of the column field values via a type of notation;
    storing each of the plurality of documents to different rows in the wide-column store by mapping the unique keys directly to different row keys of the wide-column store and adding a first prefix to each of the different column names of the columns of the fields comprising the pairs of the name and the values;
    defining a graph edge as a function of a relationship between a first source document and a second of the documents as a tuple of a source, a target, a tag and a value, wherein the source is the first source document key, the target is the second document key, the tag is a label of the relationship, and the value is an object associated with the relationship; and
    storing the graph edge as a graph column within the row of the first source document with a name that is different from names of other columns within said row of the first source document by adding a second prefix to the graph column name that is different from the first prefix;
    wherein the array value is an ordered list of a plurality of array values, and wherein the defining the plurality of columns for the field pair of the name and the array comprises defining a cell value of the column fields as a size of the array, and defining a plurality of additional columns for the row for each of the array values in recursively named columns of a form of ["name[0]", "name[1]", . . . , "name [n−1]"], where "n" is the array value; and
    wherein the nested object comprises a quantity of "y" of a plurality of sub fields, and wherein the defining the plurality of columns for the field pair of the name and the nested object comprises defining a cell value of the column fields as a combination of the nested object sub fields, and defining the plurality of additional columns for the row for each of the array values in recursively named columns of a form of ["name.subfield-1", "name.subfield-2", . . . "name.subfield-y"].

2. The method of claim 1, further comprising:
    integrating computer-readable program code into a computer system comprising the processor, a computer readable memory in circuit communication with the processor, and a computer readable storage medium in circuit communication with the processor; and
    wherein the processor executes program code instructions stored on the computer-readable storage medium via the computer readable memory and thereby performs the steps of defining the plurality of documents, storing each of the plurality of documents to the different rows in the wide-column store, defining the columns for each of the document rows within the wide-column store, defining the graph edge, and storing the graph edge as the graph column within the row of the first source document.

3. The method of claim 1, wherein the unique key is an alpha-numeric value.

4. The method of claim 1, wherein the type of notation is dot notation or separator notation.

5. The method of claim 1, wherein the step of storing each of the plurality of documents to the different rows in the wide-column store comprises storing the documents in a first column family; and
    wherein the step of storing the graph edge as the graph column within the row of the first source document comprises the storing the graph column in a second column family that is different from the first column family.

6. A system, comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:
    defines a plurality of documents, each with a unique key that is different from a key of any other of the documents;
    defines a plurality of columns, one for each of a plurality of document rows, within a wide-column store, wherein the columns each have a field comprising a pair of a name and a value that is selected from the group consisting of a nested object and an array, wherein each of the column fields have different column names;

indicates a data type of the column field values via a type of notation;

stores each of the plurality of documents to different rows in the wide-column store by mapping the unique keys directly to different row keys of the wide-column store and adding a first prefix to each of the different column names of the columns of the fields comprising the pairs of the name and the values;

defines a graph edge as a function of a relationship between a first source document and a second of the documents as a tuple of a source, a target, a tag and a value, wherein the source is the first source document key, the target is the second document key, the tag is a label of the relationship, and the value is an object associated with the relationship; and stores the graph edge as a graph column within the row of the first source document with a name that is different from names of other columns within said row of the first source document by adding a second prefix to the graph column name that is different from the first prefix;

wherein the array value is an ordered list of a plurality of array values, and wherein defining the plurality of columns for the field pair of the name and the array comprises defining a cell value of the column fields as a size of the array, and defining a plurality of additional columns for the row for each of the array values in recursively named columns of a form of ["name[0]", "name[1]", . . . , "name [n−1]"], where "n" is the array value; and wherein the nested object comprises a quantity of "y" of a plurality of sub fields, and wherein defining the plurality of columns for the field pair of the name and the nested object comprises defining a cell value of the column fields as a combination of the nested object sub fields, and defining the plurality of additional columns for the row for each of the array values in recursively named columns of a form of ["name.subfield-1", "name.subfield-2", . . . "name.subfield-y"].

7. The system of claim 6, wherein the unique key is an alpha-numeric value.

8. The system of claim 6, wherein the type of notation is dot notation or separator notation.

9. The system of claim 7, wherein the processor executes the program instructions stored on the computer-readable storage medium via the computer readable memory and thereby further:

stores each of the plurality of documents to the different rows in the wide-column store by storing the documents in a first column family; and stores the graph edge as the graph column within the row of the first source document by the storing the graph column in a second column family that is different from the first column family.

10. A computer program product for defining a NoSQL database structure that supports wide-column, document, and graph data models, the computer program product comprising:

a computer readable hardware storage device having computer readable program code embodied therewith, wherein the hardware storage device is not a transitory signal per se, the computer readable program code comprising instructions for execution by a processor that cause the processor to:

define a plurality of documents, each with a unique key that is different from a key of any other of the documents;

define a plurality of columns, one for each of a plurality of document rows within a wide-column store, wherein the columns each have a field comprising a pair of a name and a value that is selected from the group consisting of a nested object and an array, wherein each of the column fields have different column names;

indicate a data type of the column field values via a type of notation;

store each of the plurality of documents to different rows in the wide-column store by mapping the unique keys directly to different row keys of the wide-column store and adding a first prefix to each of the different column names of the columns of the fields comprising the pairs of the name and the values;

define a graph edge as a function of a relationship between a first source document and a second of the documents as a tuple of a source, a target, a tag and a value, wherein the source is the first source document key, the target is the second document key, the tag is a label of the relationship, and the value is an object associated with the relationship; and store the graph edge as a graph column within the row of the first source document with a name that is different from names of other columns within said row of the first source document by adding a second prefix to the graph column name that is different from the first prefix;

wherein the array value is an ordered list of a plurality of array values, and wherein defining the plurality of columns for the field pair of the name and the array comprises defining a cell value of the column fields as a size of the array, and defining a plurality of additional columns for the row for each of the array values in recursively named columns of a form of ["name[0]", "name[1]", . . . , "name [n−1]"], where "n" is the array value; and wherein the nested object comprises a quantity of "y" of a plurality of sub fields, and wherein defining the plurality of columns for the field pair of the name and the nested object comprises defining a cell value of the column fields as a combination of the nested object sub fields, and defining the plurality of additional columns for the row for each of the array values in recursively named columns of a form of ["name.subfield-1", "name.subfield-2", . . . "name.subfield-y"].

11. The computer program product of claim 10, wherein the computer readable program code instructions for execution by the processor further cause the processor to indicate the data type of the column field values via a dot notation or a separator notation.

12. The computer program product of claim 10, wherein the computer readable program code instructions for execution by the processor further cause the processor to:

store each of the plurality of documents to the different rows in the wide-column store by storing the documents in a first column family; and store the graph edge as the graph column within the row of the first source document by the storing the graph column in a second column family that is different from the first column family.

* * * * *